United States Patent
Harding

(10) Patent No.: US 8,346,477 B2
(45) Date of Patent: Jan. 1, 2013

(54) METHOD OF CONTEXTUALLY DISPLAYING POINTS OF INTEREST ON A PERSONAL NAVIGATION DEVICE ACCORDING TO TRAVEL PURPOSE

(75) Inventor: Arran Connel Harding, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 574 days.

(21) Appl. No.: 12/622,426

(22) Filed: Nov. 19, 2009

(65) Prior Publication Data

US 2011/0118976 A1    May 19, 2011

(51) Int. Cl.
*G01C 21/34* (2006.01)
*G01C 21/36* (2006.01)
(52) U.S. Cl. ............ 701/426; 701/438; 340/995.24
(58) Field of Classification Search ............ None
See application file for complete search history.

(56) References Cited

U.S. PATENT DOCUMENTS

| 2007/0032947 A1* | 2/2007 | Yamada et al. ............ 701/208 |
| 2008/0027631 A1 | 1/2008 | Obradovich |
| 2008/0153512 A1* | 6/2008 | Kale et al. ............ 455/456.3 |
| 2009/0171573 A1 | 7/2009 | Chang |
| 2011/0004523 A1* | 1/2011 | Giuli et al. ............ 705/14.58 |

FOREIGN PATENT DOCUMENTS

| DE | 10 2005 020 151 A1 | 11/2006 |
| DE | 10 2006 035 606 A1 | 2/2007 |

* cited by examiner

*Primary Examiner* — Michael J. Zanelli
(74) *Attorney, Agent, or Firm* — Winston Hsu; Scott Margo

(57) ABSTRACT

A method of contextually displaying points of interest (POIs) on a personal navigation device according to a user's travel purpose includes storing a plurality of POIs into a memory of the personal navigation device, the POIs having corresponding POI category labels, entering a destination location into the personal navigation device and providing navigational instructions for a trip to the destination location, associating a travel category with the trip to the destination location, and displaying POIs whose corresponding POI category labels are included in the travel category associated with the trip to the destination location.

18 Claims, 4 Drawing Sheets

METHOD OF CONTEXTUALLY DISPLAYING POINTS OF INTEREST ON A PERSONAL NAVIGATION DEVICE ACCORDING TO TRAVEL PURPOSE

BACKGROUND OF THE INVENTION

1. Field of the Invention

The invention relates to a personal navigation device, and more particularly, to a personal navigation device that displays points of interest that relates to a user's travel purpose for producing less cluttered maps that contain more relevant information.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Portable GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

One useful feature of personal navigation devices is the ability to list nearby points of interest (POIs). In rural areas, POIs may be spread out far from each other, and can easily be shown on the display of the personal navigation device. However, when traveling through cities or other areas where there are many POIs in close proximity to one another, there can be tens of POIs located very close together. It is difficult to clearly show multiple POIs that are in very close proximity to each other on the display of a personal navigation device. Furthermore, depending on a user's travel purpose, most of the POIs may be irrelevant to the user on that particular trip. For instance, a user traveling on a business trip will have little interest in the personal navigation device displaying POIs corresponding to scenic areas. Therefore, there is a need to avoid displaying POIs that are not relevant to the user's travel purpose.

SUMMARY OF THE INVENTION

It is therefore one of the primary objectives of the claimed invention to provide a method of displaying points of interest (POIs) on a personal navigation device that relate to a user's travel purpose.

According to an exemplary embodiment of the claimed invention, a method of contextually displaying points of interest (POIs) on a personal navigation device according to a user's travel purpose is disclosed. The method includes storing a plurality of POIs into a memory of the personal navigation device, the POIs having corresponding POI category labels, entering a destination location into the personal navigation device and providing navigational instructions for a trip to the destination location, associating a travel category with the trip to the destination location, and displaying POIs whose corresponding POI category labels are included in the travel category associated with the trip to the destination location.

According to another exemplary embodiment of the claimed invention, a personal navigation device for contextually displaying points of interest (POIs) according to a user's travel purpose is disclosed. The personal navigation device includes a memory for storing a plurality of POIs having corresponding POI category labels, routing software for receiving a destination location and providing navigational instructions for a trip to the destination location, the trip to the destination location having a travel category associated with it, and a processor for controlling operation of the personal navigation device and displaying POIs whose corresponding POI category labels are included in the travel category associated with the trip to the destination location.

It is an advantage that POIs related to the user's travel purpose are shown on the personal navigation device for display useful POI information to the user while at the same time not displaying POIs that the user is not interested during the current journey. The resulting map containing POI data will be less cluttered, and the POIs that are displayed will be more relevant to the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
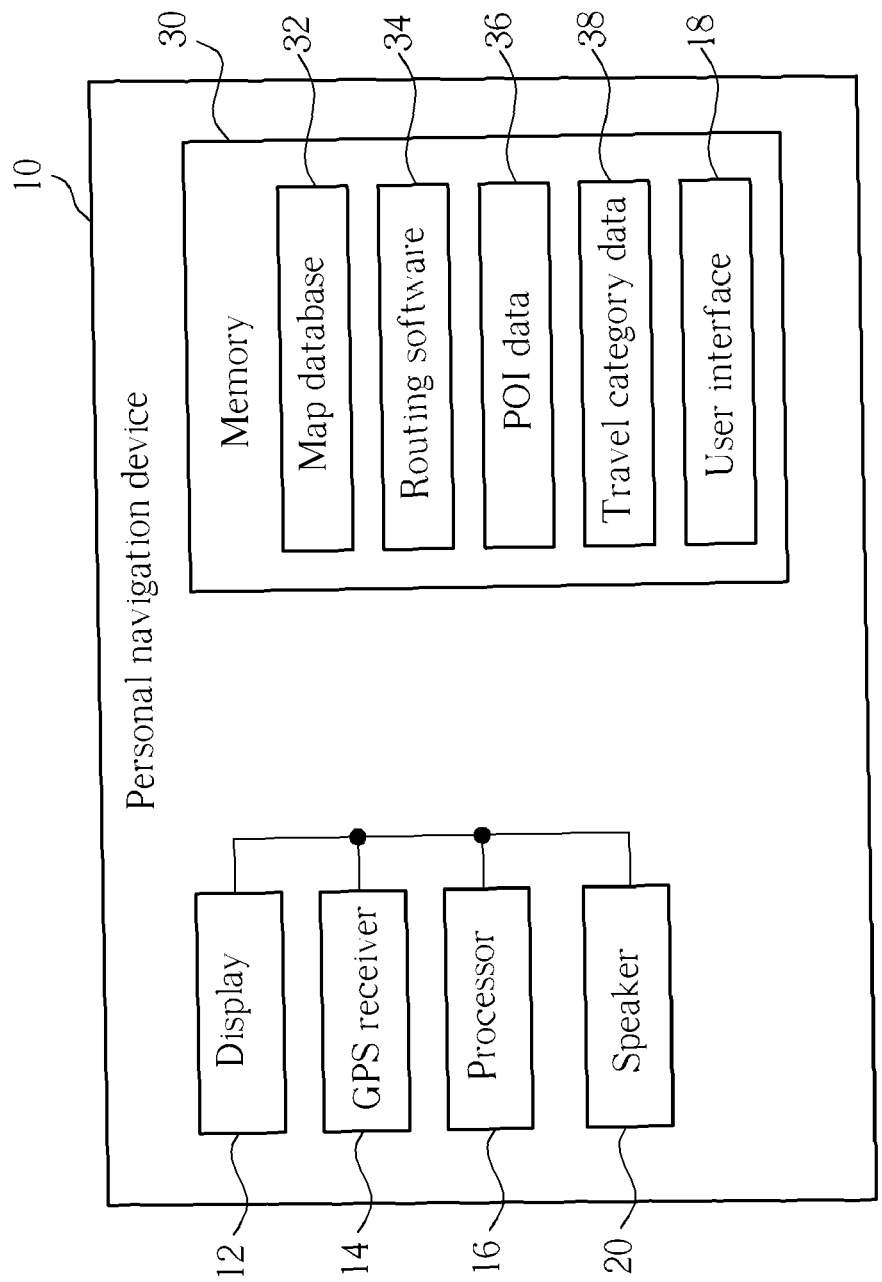
FIG. 1 is a block diagram of a personal navigation device according to the present invention.

Please refer to FIG. 1. FIG. 1 is a block diagram of a personal navigation device 10 according to the present invention. The personal navigation device 10 contains a display 12 which can be a touch sensitive display, a GPS receiver 14 for receiving the current coordinates of the personal navigation device 10, a processor 16 for controlling operation of the personal navigation device 10, a speaker 20, and memory 30. The memory 30 is used to store a map database 32 containing map data and points of interest. The memory 30 also stores routing software 34, POI data 36, travel category data 38, and a user interface 18.

The POI data 36 stores a plurality of POIs, and each POI has at least one corresponding POI category label. Common category labels include "gas station", "restaurant", "hotel", and so on. The POI category label corresponding to each POI makes it possible to conveniently group multiple categories of POIs into distinct travel categories.

Figure 2:
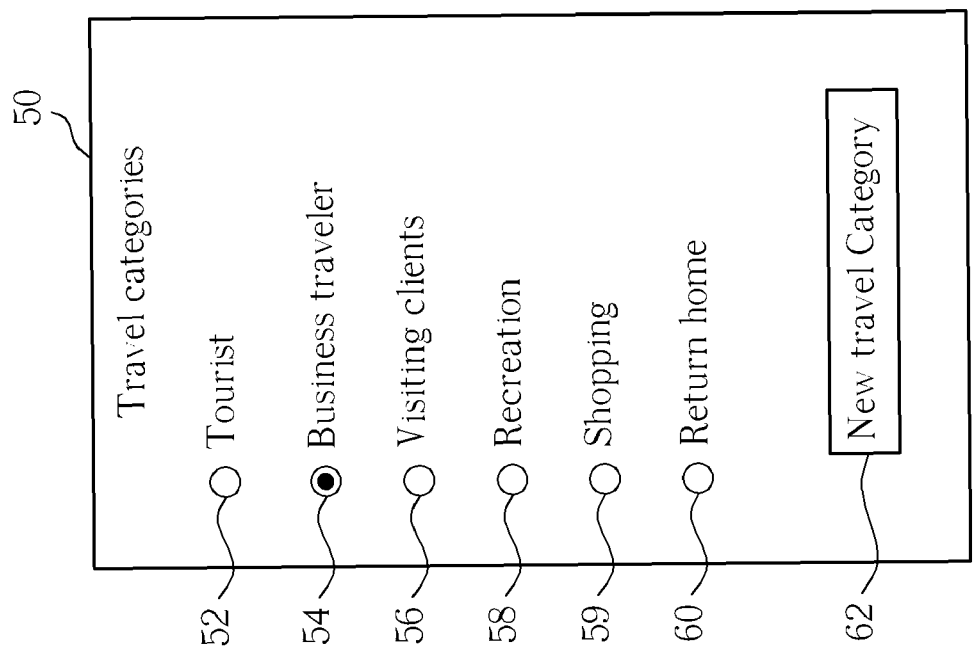
FIG. 2 is a screen showing travel categories that may be selected by the user of the personal navigation device.

Please refer to FIG. 2. FIG. 2 is a screen 50 showing travel categories that may be selected by the user of the personal navigation device 10. Six example travel categories are shown in FIG. 2, although the present invention is not limited to these travel categories. The six travel categories have a corresponding radio button 52, 54, 56, 58, 59, 60 beside the travel category name for allowing the user to select one of the pre-defined travel categories. Also, a button 62 is provided to allow the user of the personal navigation device 10 to define a new travel category. Radio button 52 corresponds to a tourist travel category, for which the user may be interested in gas stations, restaurants, scenic areas, and hotels. Radio button 54 corresponds to a business traveler travel category, for which the user may be interested in gas stations, restaurants, and hotels, but not scenic areas. Radio button 56 corresponds to a visiting client travel category, for which the user is a salesman who visits different clients every day and would be interested in seeing POI categories like restaurants, parking, and gas stations, but would not be interested in seeing scenic areas or shopping malls. Radio button 58 corresponds to a recreation travel category, for which the user may wish to take a leisurely drive around for relaxation and would be interested in seeing POI categories such as restaurants, bars and clubs, and scenic areas, but would not be interested in seeing bus stations or business buildings. Radio button 59 corresponds to a shopping travel category, for which the user would wish to drive to go shopping and would be interested in seeing POI categories such as stores and shops of all kinds, automatic teller machines (ATMs), and restaurants, but would not be interested in seeing scenic spots or hospitals. Radio button 60 corresponds to a return home travel category, for which the user may not want any POIs displayed on the personal navigation device 10, with the possible exception of gas stations or other desired POIs. As shown in FIG. 2, radio button 54 is selected, meaning that the user is currently traveling on business.

Figure 3:
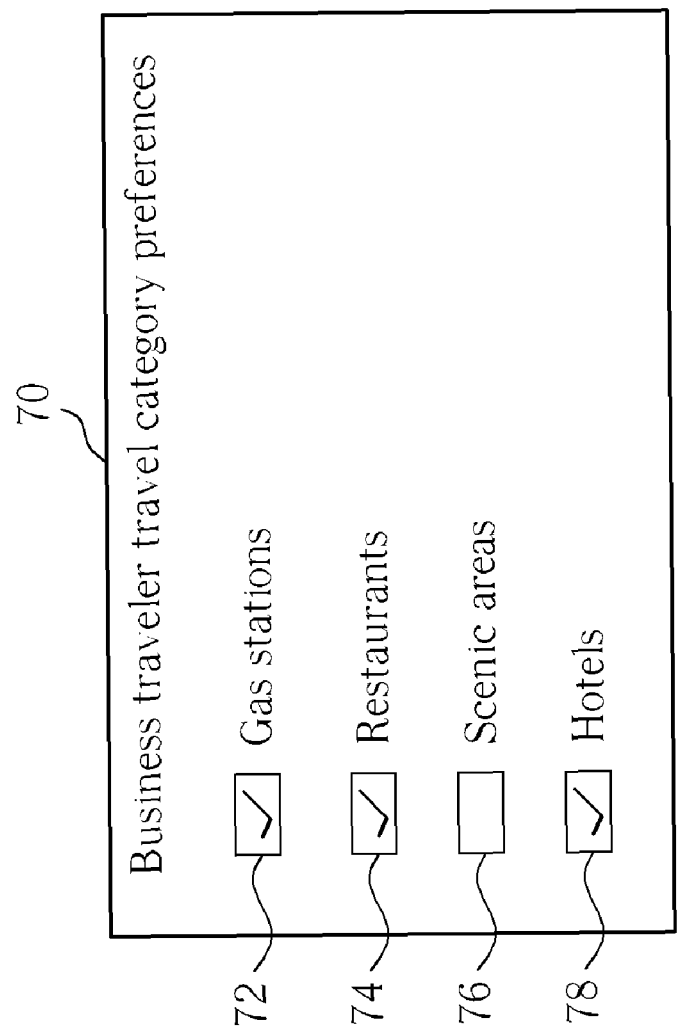
FIG. 3 is a screen showing POI category labels that may be selected by the user when setting travel category preferences.

Each travel category can be customized by the user for containing only those POIs that belong to selected POI category labels. Please refer to FIG. 3. FIG. 3 is a screen 70 showing POI category labels that may be selected by the user when setting travel category preferences. In this example, since the user is traveling on business as indicated in FIG. 2, the user may choose to define which POI category labels belong to the business traveler travel category. In screen 70, four different checkboxes 72, 74, 76, 78 are shown by way of example. Three of the checkboxes 72, 74, 78 have been selected for selecting POIs having POI category labels of "gas stations", "restaurants", and "hotels", respectively. Checkbox 76 has not been selected for excluding POIs having the POI category label of "scenic areas". Therefore, the user will not be shown POIs for scenic areas when traveling on a business trip, but will be shown POIs for gas stations, restaurants, and hotels.

Figure 4:
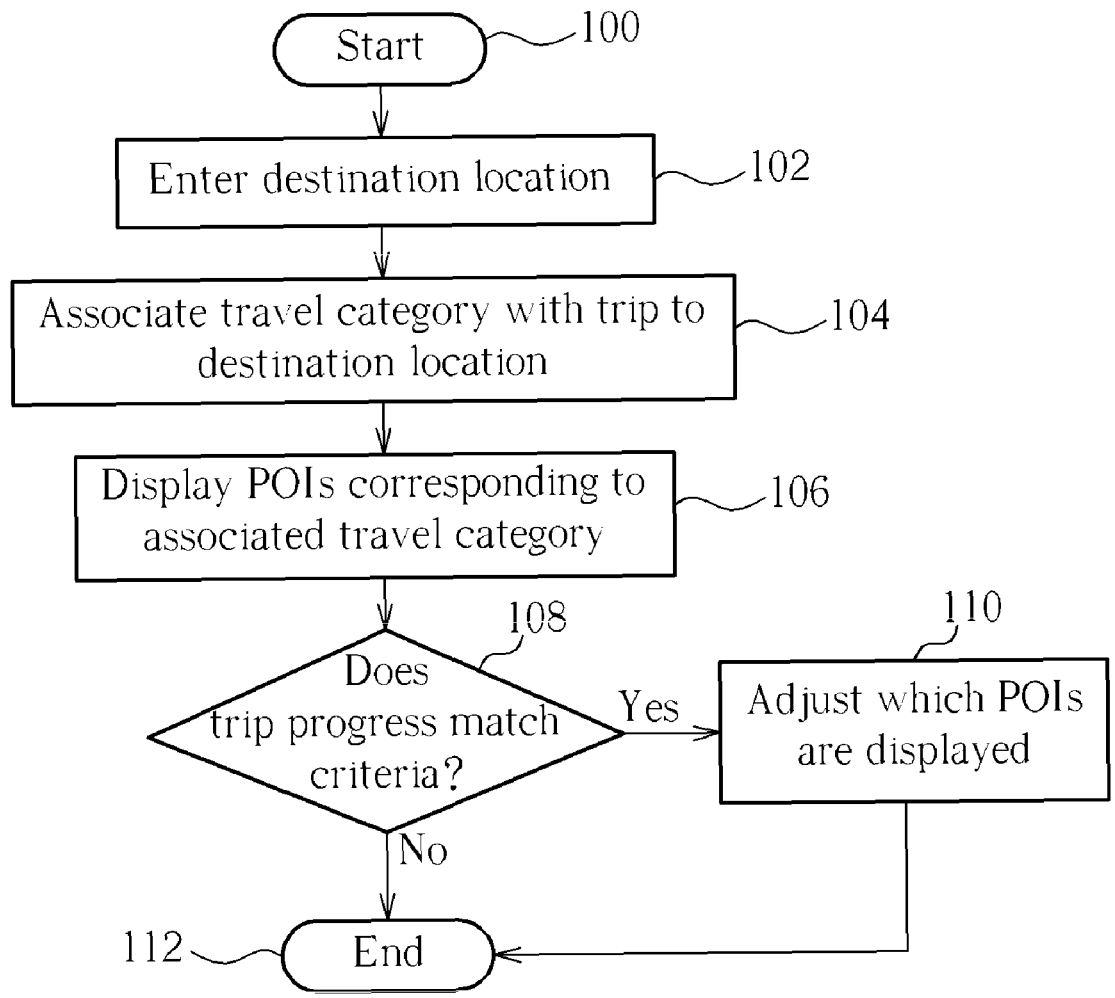
FIG. 4 is a flowchart illustrating the present invention method of contextually displaying POIs on the personal navigation device according to a user's travel purpose.

Please refer to FIG. 4. FIG. 4 is a flowchart illustrating the present invention method of contextually displaying POIs on the personal navigation device 10 according to a user's travel purpose.

Step 100: Start.

Step 102: The user enters a destination location into the personal navigation device 10 and asks for routing assistance. The routing software 34 of the personal navigation device 10 then generates a route for the user to follow on a trip to the destination location.

Step 104: A travel category is associated with the trip to the destination location. This travel category, such as "tourist", "business traveler", "visiting client", "travel", "shopping", or "return home", may be manually selected by the user or may be automatically determined by the personal navigation device 10 according to the destination location entered. For instance, if the user entered a famous vacation resort as the destination location, the personal navigation device 10 can make an assumption that the user is a tourist and select the "tourist" travel category accordingly. As another example, if the user entered the user's home as the destination location, the personal navigation device 10 can make an assumption that the user is returning home and select the "return home" travel category accordingly.

Step 106: After the travel category is associated with the trip to the destination location, the personal navigation device 10 displays POIs corresponding to the travel category associated with the trip.

Steps 108 and 110 can be optionally performed for adjusting the POIs shown on the display 12 of the personal navigation device 10 according to the user's progress on the trip to the destination location.

Step 108: Determine if data pertaining to the trip progress match predetermined criteria. A first criterion can refer to a clock of the personal navigation device 10 to count how many hours have elapsed since the user last stopped for a time period greater than a predetermined period of time. If the user has driven for many hours since the last stop, the user may wish to stop at a rest area or stop at a gas station to fill up with gas. A second criterion can use the clock to determine the current time of day. The time of day may determine what POIs the user is most interested in. For instance, the user may be looking for restaurants around breakfast, lunch, and dinner time, and may be looking for a hotel later in the day. A third criterion can be measuring how close the personal navigation device 10 currently is to the destination location. If the personal navigation device 10 is getting close to the destination location, the user may wish to stop and eat before arriving or stop and get a gift for the person that the user is visiting. If the trip progress data matches any of the predetermined criteria, go to step 110. Otherwise, go to step 112.

Step 110: Adjust which POIs the personal navigation device 10 displays according to the trip progress data measured in step 108. In addition to displaying POIs belonging to certain POI category labels, other POIs belonging to other POI categories can be hidden from view so as to not obscure other more relevant POIs.

Step 112: End.

In summary, the present invention provides a way to display POIs that are relevant to the user's travel purpose. Unrelated POIs are not shown, thereby reducing clutter and increasing the user's interest in the remaining POIs by keeping the POIs appropriate for the purpose of the user's trip. As a result, the personal navigation device provides the user with a more enjoyable experience and encourages the user to continue using the personal navigation device on future trips.

Those skilled in the art will readily observe that numerous modifications and alterations of the device and method may be made while retaining the teachings of the invention.

What is claimed is:

1. A method of contextually displaying points of interest (POIs) on a personal navigation device according to a user's travel purpose, the method comprising:

storing a plurality of POIs into a memory of the personal navigation device, the POIs having corresponding POI category labels;

entering a destination location into the personal navigation device and providing navigational instructions for a trip to the destination location;

associating a travel category selected from a plurality of travel categories with the trip to the destination location, wherein each travel category corresponds to multiple POI categories; and displaying only POIs whose corresponding POI category labels are included in the travel category associated with the trip to the destination location.

2. The method of claim 1, wherein associating the travel category with the trip to the destination location comprises the user manually specifying the travel category.

3. The method of claim 1, wherein associating the travel category with the trip to the destination location comprises the personal navigation device automatically determining the travel category according to the destination location.

4. The method of claim 1, wherein the user defines which POI category labels are included in each travel category.

5. The method of claim 1, wherein the user defines new travel categories and defines which POI category labels are included the new travel categories.

6. The method of claim 1 further comprising adjusting which POIs are displayed according to data about the user's progress on the trip.

7. The method of claim 6, wherein adjusting which POIs are displayed is performed according to how many hours have elapsed since a last stop lasting greater than a predetermined period of time.

8. The method of claim 6, wherein adjusting which POIs are displayed is performed according to how close the personal navigation device is to the destination location.

9. The method of claim 6, wherein adjusting which POIs are displayed is performed according to the time of day.

10. A personal navigation device for contextually displaying points of interest (POIs) according to a user's travel purpose, the personal navigation device comprising:
    a memory for storing a plurality of POIs having corresponding POI category labels;
    routing software for receiving a destination location and providing navigational instructions for a trip to the destination location, the trip to the destination location being associated with a travel category selected from a plurality of travel categories, wherein each travel category corresponds to multiple POI categories; and
    a processor for controlling operation of the personal navigation device and controlling a display of the personal navigation device to display only POIs whose corresponding POI category labels are included in the travel category associated with the trip to the destination location.

11. The personal navigation device of claim 10 further comprising a user interface, wherein the user manually specifies through the user interface the travel category for associating the travel category with the trip to the destination location.

12. The personal navigation device of claim 10, wherein the personal navigation device automatically determines the travel category according to the destination location for associating the travel category with the trip to the destination location.

13. The personal navigation device of claim 10 further comprising a user interface, wherein the user defines through the user interface which POI category labels are included in each travel category.

14. The personal navigation device of claim 10 further comprising a user interface, wherein the user defines through the user interface new travel categories and defines through the user interface which POI category labels are included the new travel categories.

15. The personal navigation device of claim 10, wherein the processor adjusts which POIs are displayed according to data about the user's progress on the trip.

16. The personal navigation device of claim 15, wherein the processor adjusts which POIs are displayed according to how many hours have elapsed since a last stop lasting greater than a predetermined period of time.

17. The personal navigation device of claim 15, wherein the processor adjusts which POIs are displayed according to how close the personal navigation device is to the destination location.

18. The personal navigation device of claim 15, wherein the processor adjusts which POIs are displayed according to the time of day.

* * * * *